(12) United States Patent
Jiang et al.

(10) Patent No.: US 6,982,997 B1
(45) Date of Patent: Jan. 3, 2006

(54) SINGLE-FREQUENCY NARROW LINEWIDTH 1μM FIBER LASER

(75) Inventors: Shibin Jiang, Tucson, AZ (US); Yushi Kaneda, Tucson, AZ (US); Christine Speigelberg, Tucson, AZ (US); Tao Luo, Tucson, AZ (US)

(73) Assignee: NP Photonics, Inc., Tucson, AZ (US)

( * ) Notice: Subject to any disclaimer, the term of this patent is extended or adjusted under 35 U.S.C. 154(b) by 273 days.

(21) Appl. No.: 10/665,032

(22) Filed: Sep. 16, 2003

(51) Int. Cl.
 H01S 3/30 (2006.01)
 H01S 3/08 (2006.01)
 H01S 3/98 (2006.01)

(52) U.S. Cl. .............................. 372/6; 372/18; 372/19; 372/102

(58) Field of Classification Search ................... 372/6, 372/18, 19, 102; 359/341.1
 See application file for complete search history.

(56) References Cited

U.S. PATENT DOCUMENTS

| | | | |
|---|---|---|---|
| 4,578,793 A | 3/1986 | Kane et al. | |
| 5,043,996 A | 8/1991 | Nilsson et al. | |
| 5,237,576 A | 8/1993 | DiGiovanni | |
| 5,305,335 A | 4/1994 | Ball et al. | |
| 5,469,520 A | 11/1995 | Morey et al. | |
| 5,710,786 A | 1/1998 | Mackechnie et al. | |
| 6,229,827 B1 | 5/2001 | Fernald et al. | |
| 2003/0152115 A1* | 8/2003 | Jiang et al. | 372/6 |

OTHER PUBLICATIONS

Yushi Takenaka et al., High-power CO2 laser with a Gauss-core resonator for high-speed cutting of thin metal sheets, Optics Letters, Jan. 1, 1997, vol. 22, No. 1 pp. 37-39.

G.A. Ball et al., Standing-Wave Monomode Erbium Fiber Laser, IEEE Photonics Technology Letters, Jul. 1991, vol. 3, No. 7, pp. 613-615.

J.R. Armitage et al., Highly Efficient 980 nm Operation of an Yb3+-Doped Silica Fibre Laser, Electronics Letters, Mar. 2, 1989, vol. 25, No. 5, pp. 298-299.

H.M. Pask et al., OPeration of cladding-pumped Yb3+-doped silica fibre lasers in 1 um region, Electronics Letters, May 26, 1994, vol. 30, No. 11, pp. 863-865.

M. Auerbach et al., High-power tunable narrow line width ytterbium-doped double clad fiber laser, Optics Communications 195, Aug. 15, 2001, pp. 437-441.

R. Paschotta, Single-frequency ytterbium-doped fiber laser stabilized by spatial hole burning, Optics Letters, Jan. 1, 1997, vol. 22, No. 1, pp. 40-42.

Michel J. F. Digonnet, Rare Earth Doped Fiber Lasers and Amplifiers, Marcel Dekker, New York 2001—book.

W.H. Loh et al., High Performance Single Frequency Fiber Grating-Based Erbium:Ytterbium-Codoped Fiber Lasers, Journal of Lightwave Technology, Jan. 1998, vol. 16, No. 1, pp. 114-118.

* cited by examiner

Primary Examiner—Zandra V. Smith
Assistant Examiner—Marcia A. Golub
(74) Attorney, Agent, or Firm—Eric A. Gifford

(57) ABSTRACT

A compact single frequency, single-mode 1 $\mu$m fiber laser with narrow linewidth (<10 kHz) and high output power (>2 mW) is formed with an oxide-based multi-component glass fiber doped with triply ionized rare-earth ytterbium ions and fiber gratings formed in sections of passive silica fiber and fused thereto. The multi-component glass supports higher doping concentrations than standard silica fiber, hence higher output power levels in short cavities. Formation of the gratings in passive silica fiber both facilitates splicing to other optical components and reduces noise thus improving linewidth.

21 Claims, 5 Drawing Sheets

SINGLE-FREQUENCY NARROW LINEWIDTH 1µM FIBER LASER

BACKGROUND OF THE INVENTION

1. Field of the Invention

This invention relates to fiber lasers and more specifically to a single frequency 1 µm fiber laser with narrow linewidth (<10 kHz) formed from ytterbium doped oxide-based multicomponent glasses.

2. Description of the Related Art

Rare-earth doped glass fiber lasers were first proposed in the 1960s and have received considerable attention in the 1980s for potential applications in optical communication (Michel J. F. Digonnet, "Rare-Earth Doped Fiber Lasers and Amplifiers," Marcel Dekker, New York 2001). For laser emission to occur, the active fiber is placed inside a resonant cavity. The optical feedback can be provided simply by the reflectivity of the end facets, by mirrors, by distributed feedback Bragg (DFB) gratings, or by distributed Bragg reflectors (DBR), or by constructing a ring cavity structure. Laser emission occurs when the total gain overcomes the losses in the cavity. Hence, a minimum gain has to be achieved to reach the laser threshold condition.

Typical fiber lasers lase in a great number of longitudinal modes in single transverse mode optic fibers, the so-called single mode fibers. A single longitudinal mode (single frequency) fiber laser 1.55 µm was demonstrated by Ball et al (G. A. Ball, W. W. Morey, W. H. Glenn, IEEE Photonics Technology Letters, Vol. 3, No. 7, July 1991) utilizing two intracore Bragg reflectors for cavity feedback and longitudinal mode discrimination in a 50 cm $Er^{3+}$ doped silica fiber. U.S. Pat. No. 5,305,335 to Ball describes single frequency $Er^{3+}$ doped fiber laser consisting of a pair of Bragg reflectors separated by a 9 cm cavity. U.S. Pat. No. 5,237,576 to DiGiovanni describes a fiber laser of 5 cm or less using fluorine-phosphorous-doped silica matched index cladding, a germania-alumina-doped silica outer core and an alumina-erbium-doped silica inner core in which the DBRs are formed in the doped fiber. W. H. Loh et al. Journal of Lightwave Technology, Vol. 16, No. 1, pp. 114–118 January 1998 describes a 1.5 cm phosphosilicate single-mode fiber lasers co-doped with Er:Yb. These lasers provide a 1.5 µm single-frequency output of less than 1 mW typically. A booster amplifier is required to produce output powers greater than 10 mW. U.S. Pat. No. 5,469,520 to Morey and U.S. Pat. No. 6,229,827 to Fernald describe tuning techniques using fiber Bragg gratings.

Other applications, such as, seeder lasers, LIDAR, optical heterodyne systems, nonlinear frequency conversion, coherent satellite communication, and distributed sensing require a robust 1 µm single frequency narrow linewidth fiber laser with output powers of at least 2 mW, preferably more than 20 mW. A 1 µm wavelength is required to match the gain energy level of the widely used Nd:YAG laser crystal at 1.064 µm. Single-frequency operation with a linewidth less than 10 kHz provides both the resolution and long coherence needed by these applications. The 1 µm laser should have sufficient output power without the need for a booster amplifier in order to maintain the high signal to noise ratio.

Current 1 µm single frequency narrow linewidth lasers are generated from solid state lasers using non-planar ring oscillators (NPROs) technology. U.S. Pat. No. 4,578,793 to Kane and U.S. Pat. No. 5,043,996 describe solid state monolithic nonplanar ring oscillators which can operate as unidirectional single-frequency lasers in the presence of a sufficiently strong magnetic field.

Current 1 µm fiber laser technology does not support such performance. Efficient single transverse mode 1 µm ytterbium silica fiber lasers are described by J. R. Armitage et al Electronics Letters, Vol. 25, No. 5, 1989, pp. 298–299 and H. M. Pask et al Electronics Letters, Vol 30, No. 11, 1994, pp. 863–864. M. Auerbach et al Optics Communications, 195 (2001) pp. 437–441 reported a 1.6W 1 µm ytterbium fiber laser with a spectral line width of 600 MHz from a double-clad silica fiber. 0.5 mW Single-frequency 1 µm ytterbium-doped silica fiber laser was achieved using 1.5 to 10 m long silica fiber stabilized by spatial hole burning by R. Paschotta et al Optic Letters Vol. 22, No. 1, pp. 40–42. U.S. Pat. No. 5,710,786 describes a 1 µm pump source for pumping ionized praseodymium for amplification of signals in the 1280 to 1340 nm range. The pump source uses a silica-based glass double-clad optical fibre doped with triply ionized rare-earth ytterbium ions and fibre gratings formed therein. To efficiently pump the praseodymium, the pump source output has a single spatial (transverse) mode at the laser wavelength of 1012 to 1022 nm. U.S. Pat. No. 5,991,314 to Ionov et al describes cladding pumped ytterbium fiber laser for pumping erbium doped fiber amplifiers. All these ytterbium fiber lasers were demonstrated in silica fibers.

It is very difficult if not impossible to demonstrate high power single frequency narrow linewidth 1 µm ytterbium silica fiber laser with the present state of the art. It is therefore an object of the presentation invention to provide a high power single frequency narrow linewidth 1 µm fiber laser.

SUMMARY OF THE INVENTION

The present invention provides a compact single frequency, single-mode 1 µm fiber laser with narrow linewidth (<10 kHz) and high output power (>2 mW and preferably >20 mW).

The 1 um fiber laser is formed with an oxide-based multi-component glass fiber doped with triply ionized rare-earth ytterbium ions and fiber gratings formed in sections of passive silica fiber and fused thereto. The multi-component glass supports higher doping concentrations, 0.5–30 wt. %, than silica fiber, hence higher output power levels in fiber lengths less than 5 cm and preferably less than 3 cm. Formation of the gratings in passive silica fiber both facilitates splicing to other optical components and reduces noise thus improving linewidth. The use of a polarization maintaining (PM) fiber in the pump source further improves wavelength stability, linewidth and vibration/acoustic sensitivity.

In another embodiment, the gain fiber is a polarization maintaining (PM) fiber, which reduces the noise level in the laser and improves output power stability. As a result of their specific local environment, the active ions experience an anisotropy that leads to polarization dependent gain, which means that the gain spectra for two different polarization components are not the same. Combining polarization selective feedback with a polarization maintaining active fiber reduces the low frequency noise that results from random polarization fluctuations inside the laser cavity.

These and other features and advantages of the invention will be apparent to those skilled in the art from the following detailed description of preferred embodiments, taken together with the accompanying drawings, in which:

DETAILED DESCRIPTION OF THE INVENTION

Figure 1:
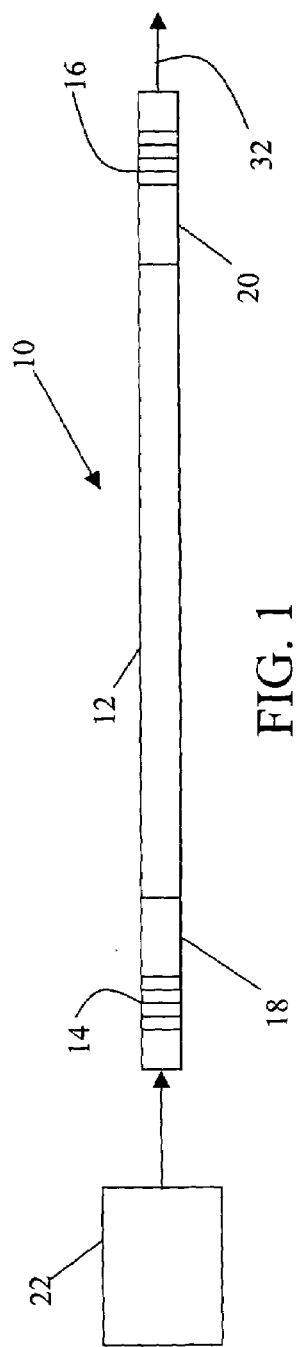
FIG. 1 is a diagram of a single-frequency fiber laser in accordance with the present invention.

The present invention provides a compact single frequency, single-mode 1 $\mu$m fiber laser with narrow linewidth (<10 kHz) and high output power (>2 mW and preferably >20 mW).

As shown in FIGS. 1 through 4, a 1 $\mu$m fiber laser 10 is formed with an oxide-based multi-component glass single mode fiber 12 doped with triply ionized rare-earth ytterbium ions. Narrowband and broadband fiber gratings 14 and 16, respectively, are formed in sections of passive silica fiber 18 and 20 and fused to the ends of gain fiber 12 to form a resonant cavity that provides the feedback necessary to sustain laser operation. The reflectivity of the broadband grating 16 should be as close to 100% as possible. The reflectivity of the narrowband grating 14 is less than 100%, suitably 30–90% depending upon the pump power and target output power, such that power can be removed from the cavity. Alternately, the broadband grating could be used to output couple the laser energy.

Multi-component glasses support higher doping concentrations than silica glass, hence higher output power levels. The ytterbium doping concentration is 0.5–30 wt. % and typically 3–20 wt. %. The formation of the gratings in passive silica fiber rather than the gain fiber reduces ASE noise, which improves linewidth. As will be described with reference to FIGS. 6 and 7, thermal stabilization and vibration isolation of the gain fiber and gratings and the use of a polarization maintaining (PM) fiber in the pump source further improve and maintain linewidth in commercial applications.

Figure 2:
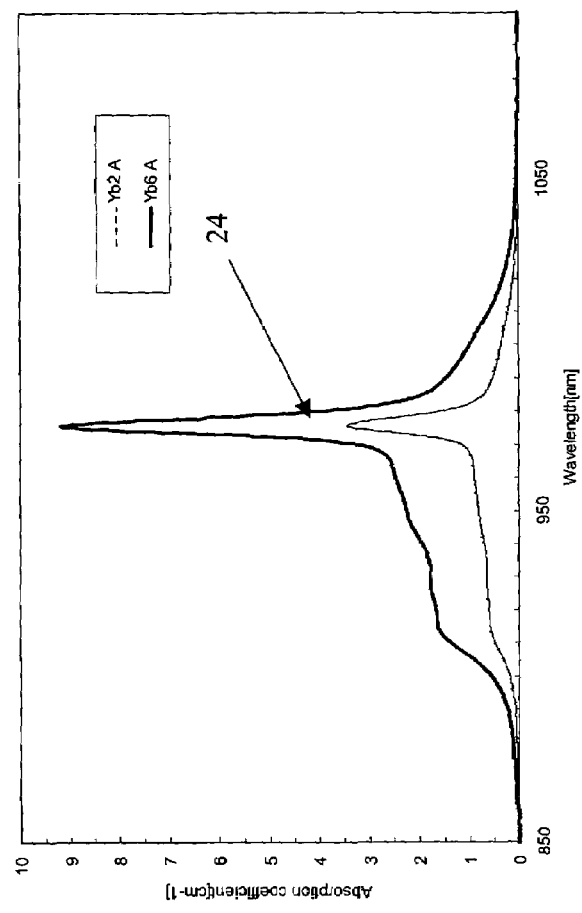
FIG. 2 is a plot of the absorption spectra of ytterbium doped glasses.

A source of pump radiation, e.g. a single-mode or multi-mode laser diode 22, illuminates fiber 12 at a wavelength, typically 915–990 nm, within the absorption band 24 of triply ionized ytterbium which occurs from 800 to 1070 nm as illustrated in FIG. 2. Pumping of the doped multi-component glass populates the ytterbium upper level creating a population inversion. Spontaneous emission catalyzes the stimulated emission of the ytterbium ions in the upper level over a range of 900 nm to 1100 nm. The emission peak occurs at a wavelength of approximately 975 nm.

Figure 3:
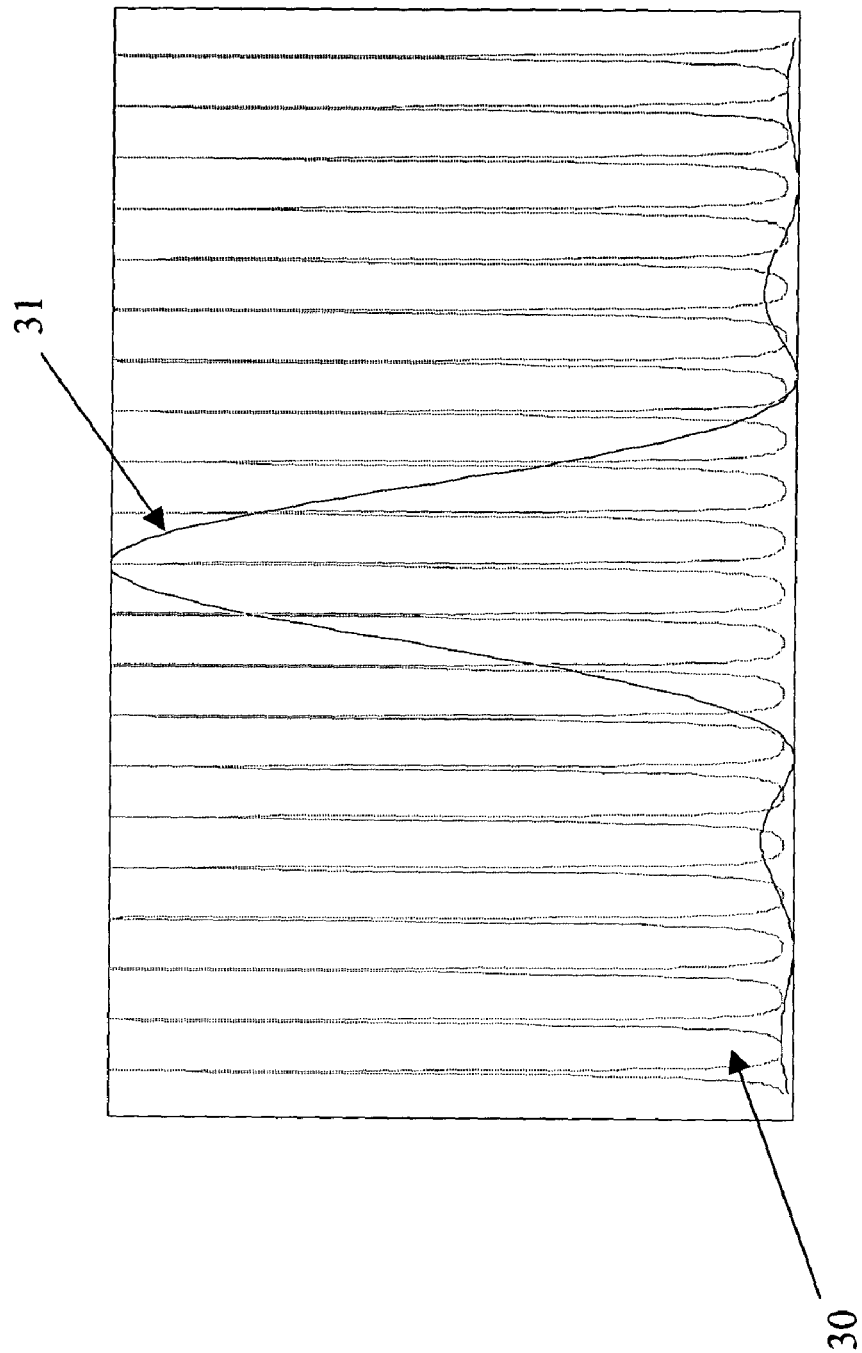
FIG. 3 is a diagram of the longitudinal mode spacing and grating bandwidth that produce a single-frequency output.
Figure 4A:
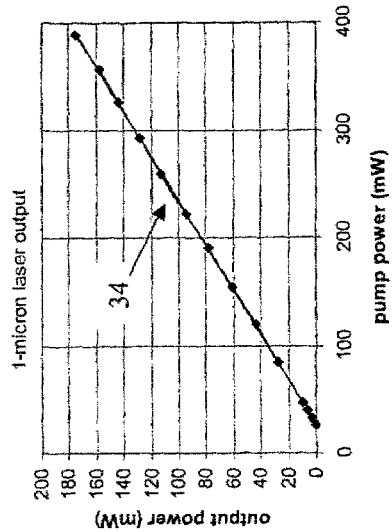
FIGS. 4a and 4b are plots illustrating single-frequency narrow linewidth performance and output power levels.
Figure 4B:
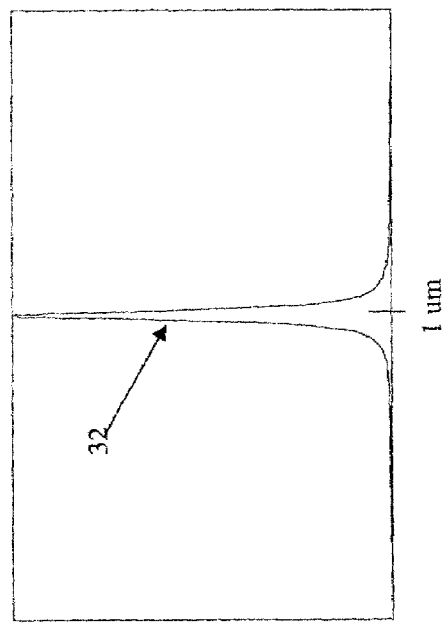

Laser emission occurs when the total gain produced by stimulated emission overcomes the losses in the cavity. The gain profile of ytterbium and the geometry of the resonant cavity create preferential feedback so that laser emission only occurs at one or more discrete wavelengths. As shown in FIG. 3, an ultra-short cavity, less than 5 cm and preferably less than 3 cm, produces a mode spacing $\Delta v$ that is larger than the linewidth 30 of the narrowband grating (less than 0.07 nm), which together with the gain spectrum 31 limits laser emission to a single longitudinal mode 32. The fiber laser outputs the single-mode signal 32 having a center wavelength between approximately 0.98 $\mu$m and 1.08 $\mu$m with a linewidth less than 10 kHz as shown in FIG. 4a. This single-frequency 1 um laser has output power levels 34 in excess of 170 mW as shown in FIG. 4b using a 400 mW laser diode pump.

To achieve both single-frequency performance and high output power levels the glass host must support very high ytterbium doping concentrations to realize the necessary gain. Compared to either silica or phosphosilicate, oxide-based multi-component glass hosts selected from phosphate, germanate or tellurite improve the solubility to ytterbium ions thereby allowing higher dopant levels without forming ion-clusters.

The multi-component laser glass contains a network former ($P_2O_5$ phosphate-oxide, $GeO_2$ germanate-oxide or $TeO_2$ tellurite-oxide), one or more glass network modifiers MO (alkaline-earth oxides and transition metal oxides such as BaO, CaO, MgO, SrO, ZnO, PbO and mixtures thereof) and one or more glass network intermediators $L_2O_3$ ($Y_2O_3$, $La_2O_3$, $Al_2O_3$, $B_2O_3$ and mixtures thereof). The modifier modifies the phosphate's glass network, thereby reducing its melting temperature and creating additional dopant sites. The intermediator bridges some of the bonds in the network thereby increasing the network's strength and chemical durability without raising the melting temperature appreciably. The multi-component glasses of interest thus have a much lower softening temperature than silica ($SiO_2$), which greatly simplifies processing. The modified network provides many more sites for hosting high concentrations of ytterbium dopants without clustering problems.

Figure 5:
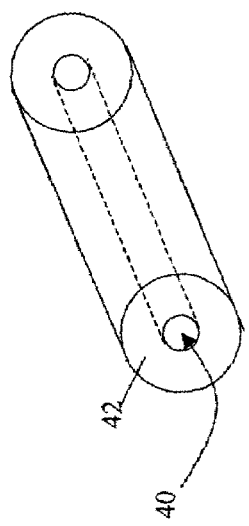
FIG. 5 is a sectional view of the gain fiber.

In general, the network former is 30 to 80 weight percent, the modifier can be at least 5% and typically 15% by weight and the intermediator can be at least 2% and typically 10% by weight of the multi-component glass. As shown in FIG. 5, the fiber core 40 is made up of the glass host doped with high concentrations of ytterbium. The cladding layer(s) 42 are typically undoped. Dopant levels range from 0.5–30 wt. % ytterbium ions with typical values of 3–20 wt. %. Initial experiments have demonstrated that this class of phosphate glass supports continuous single-mode lasing without self-pulsation at high doping concentrations.

Numerous glass compositions were characterized for thermal properties (crystallization, expansion coefficient, transition and softening temperatures, core-to-clad similarity), chemical durability, ability to host high Yb doping concentrations without quenching, spectroscopic properties (maximum emission cross-section at 1.0 microns), linewidth (maximum breadth at 1.0 microns) and refractive index to determine a range of wt. % for each ingredient that are acceptable.

EXAMPLE 1

| No. 1 | P2O5 | Al2O3 | La2O3 | Yb2O3 | BaO | B2O3 | ZnO | Total |
|---|---|---|---|---|---|---|---|---|
| Wt % | 63.30 | 4.33 | 0.31 | 2.00 | 27.68 | 1.23 | 1.15 | 100.00 |

EXAMPLE 2

| No. 2 | P2O5 | Al2O3 | La2O3 | Yb2O3 | BaO | B2O3 | ZnO | Total |
|---|---|---|---|---|---|---|---|---|
| Wt % | 61.05 | 4.17 | 0.00 | 5.79 | 26.69 | 1.19 | 1.11 | 100.00 |

EXAMPLE 3

| No. 3 | P2O5 | Al2O3 | La2O3 | Yb2O3 | BaO | B2O3 | ZnO | Total |
|---|---|---|---|---|---|---|---|---|
| Wt % | 59.62 | 4.07 | 0.00 | 8.00 | 26.06 | 1.16 | 1.08 | 99.99 |

EXAMPLE 4

| No. 4 | P2O5 | Al2O3 | La2O3 | Yb2O3 | BaO | B2O3 | ZnO | Total |
|---|---|---|---|---|---|---|---|---|
| Wt % | 56.65 | 3.87 | 0.00 | 12.57 | 24.77 | 1.10 | 1.03 | 99.99 |

EXAMPLE 5

| No. 5 | P2O5 | Al2O3 | La2O3 | Yb2O3 | BaO | B2O3 | ZnO | Total |
|---|---|---|---|---|---|---|---|---|
| Wt % | 55.08 | 3.76 | 0.00 | 15.00 | 24.08 | 1.07 | 1.00 | 99.99 |

In another embodiment, the gain fiber 12 is a polarization maintaining (PM) fiber, which reduces the noise level in the laser and improves output power stability. As a result of their specific local environment, the active ions experience an anisotropy that leads to polarization dependent gain, which means that the gain spectra for two different polarization components are not the same. Combining polarization selective feedback with a polarization maintaining active fiber reduces the low frequency noise that results from random polarization fluctuations inside the laser cavity.

The subclass of multi-component glasses has a much lower softening temperature (<600° C.) than silica (>1200° C.), which greatly simplifies the fiber drawing process and supports higher doping concentrations but complicates the process of fusion splicing to silica fiber. A quality fusion splice should exhibit low optical loss (<0.3 dB), low back reflection loss (<−50 dB) and good tensile strength (>100 g). A standard silica-to-silica fusion splice degrades the multi-component fiber. Instead an asymmetric process that softens only the multi-component fiber is employed as described in co-pending U.S. application Ser. No. 09/963,727 entitled "Method of Fusion Splicing Silica Fiber with Low-Temperature Multi-Component Glass Fiber" filed on Sep. 26, 2001, which is incorporated by reference. To reduce back-reflection, an angle splicing process in which the silica fiber is angle cleaved, the multi-component fiber square cleaved and a matched angle formed in-situ may be employed as described in co-pending U.S. application Ser. No. 10/374,001 entitled "Method of Angle Fusion Splicing Silica Fiber with Low-Temperature Non-Silica Fiber" filed on Feb. 25, 2003 the entire contents of which are incorporated by reference.

Figure 6A:
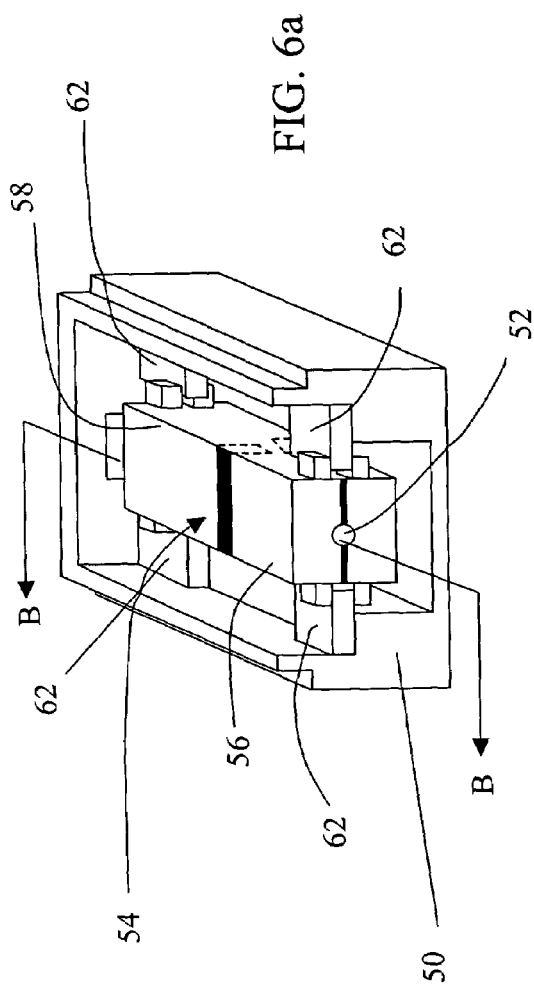
FIGS. 6a and 6b are diagrams of a packaged single-frequency fiber laser including temperature control and vibration isolation.
Figure 6B:
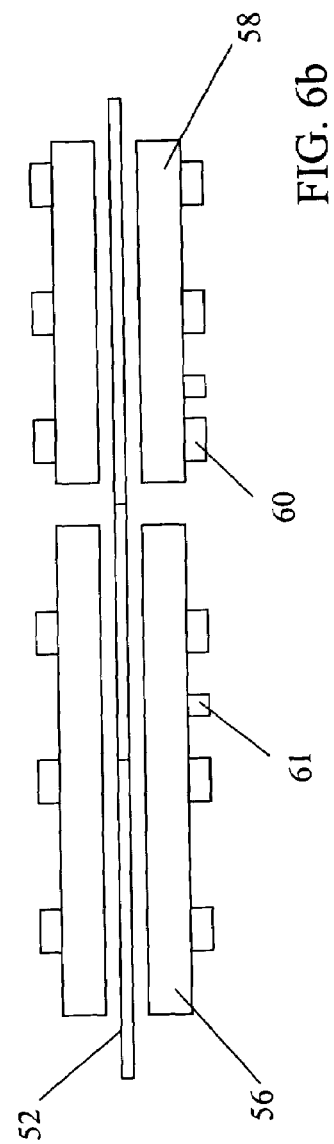

As shown in perspective in FIG. 6a and along section B—B in FIG. 6b, the single mode 1 um laser is placed inside a package 50 that provides thermal and vibration isolation. The fiber chain 52 is placed in a mounting fixture 54 having first and second thermally isolated sections 56 and 58 for supporting the narrowband and broadband fiber gratings 14 and 16 respectively. The gain fiber is supported in either the first or second section or in a third isolated section (not shown in this embodiment). Resistive heaters 60 thermistors 61 are mounted on the first and second sections and independently controlled to match the wavelengths of narrowband and broadband gratings.

The mounting fixture 54 is connected to the laser external package 50 through connectors 62 made of compliant material with relatively small Young modulus and a small thermal conductivity coefficient. The mounting fixture 54 containing the fiber chain and more specifically the first and second thermally isolated sections 56 and 58 are independently heated above room temperature and temperature stabilized. The connection to the external package 50 with the compliant connectors 62 provides simultaneously good mechanical and thermal stability to the laser itself. This is necessary for stable laser output.

Figure 7:
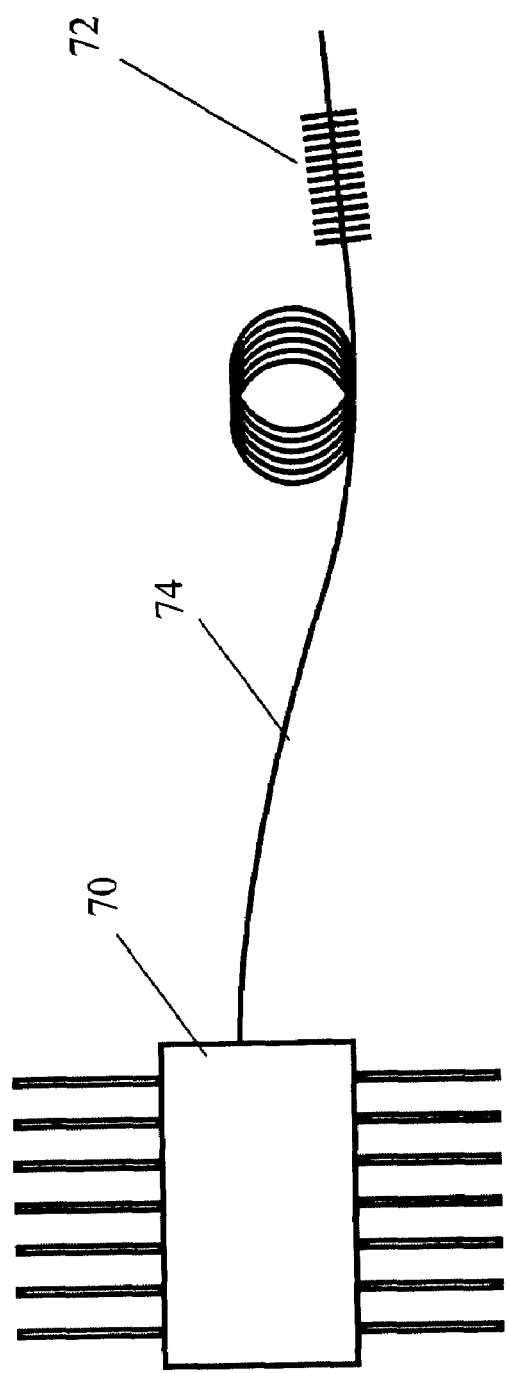
FIG. 7 is a diagram of a pump source with a PM fiber.

As described above in connection with FIG. 1, the optical cavity must be pumped to induce lasing. As shown in FIG. 7, an off-the-shelf single-mode semiconductor pump diode 22 includes a semiconductor chip 70 and a grating 72 separated by about a meter of passive fiber 74. The grating locks the pump's output to a wavelength typically between 915 nm and 990 nm. In most applications, the OTS pump diode is adequate. Since, however, very narrow linewidth lasers have a number of applications in sensing, in particular acoustic sensing, it is important to ensure very low frequency and phase noise at low frequencies. The phase noise is particularly sensitive to polarization fluctuations in the pump fiber. Single mode semiconductor pump lasers emit highly polarized light. The polarization of the pump light is, however, sensitive to birefringence fluctuations in the pump fiber if PM fiber is not employed. The fiber 74 that leads from the diode 70 to the fiber laser is typically longer than 1 m and any vibration and acoustic pickup in this fiber leads to small changes in the pump light polarization. Due to the anisotropy of the active ions, this leads to additional noise in the fiber laser output. The effect is more pronounced in the phase noise as in the intensity noise. Ronnekleiv has already pointed out that this vibration and pressure sensitivity could be largely reduced if one would use a depolarized pump source. ["Frequency and Intensity Noise of Single Frequency Fiber Bragg Grating Lasers", by Erlend Ronnekleiv, Optical Fiber Technology, 7, 206–235 (2001)—page 227, second paragraph]. Placing a depolarizer between the highly-polarized pump laser and the fiber laser is one way to reduce the acoustic pickup in the lead fiber.

Using polarization maintaining (PM) fiber 74 from the pump diode 70 to the fiber laser avoids the costly depolarizer and has the same effect. Due to the birefringence in polarization maintaining fiber, the polarization state of the pump light will not change when the fiber is subject to mechanical vibrations or acoustic pressure waves. The polarization whose stimulated emission cross section of the gain fiber is higher is aligned to the orientation of the operating polarization of the narrow-band fiber Bragg grating. Experiments have shown that using PM fiber in the pump lead greatly reduces the phase noise of the fiber laser output and the sensitivity to low frequency external noise.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A fiber laser, comprising:
    A gain fiber less than 5 cm in length including,
        A cladding formed from an oxide-based multi-component glass selected from phosphate, germanate, or tellurite; and
        A core formed from the same glass doped with 0.5–30 wt. % ytterbium oxide;
    A narrowband grating at one end of the fiber;
    A broadband grating at the other end of the fiber; and
    A source of pump radiation that illuminates the fiber so that the ytterbium oxide ions lase at a single longitudinal mode and said fiber outputs a single-mode signal having a center wavelength between approximately 0.98 $\mu$m and 1.08 $\mu$m with a linewidth less than 10 kHz.

2. The fiber laser of claim 1, wherein the glass is doped with 3–20 wt. % ytterbium oxide.

3. The fiber laser of claim 1, wherein the glass is doped with 6–15 wt. % ytterbium oxide.

4. The fiber laser of claim 1, wherein the narrowband and broadband gratings are formed in sections of passive silica fiber that are fusion spliced to the ends of the gain fiber.

5. The fiber laser of claim 1, wherein the pump includes a section of polarization maintaining fiber.

6. The fiber laser of claim 1, wherein the multi-component glass includes the following ingredients by weight percentages,
    a network former of 30 to 80 percent, where the network former is selected from phosphate-oxide $P_2O_5$, germanate-oxide $GeO_2$ or tellurite-oxide $TeO_2$,
    $L_2O_3$ of at least 10 percent, where $L_2O_3$ is selected from $Al_2O_3$, $B_2O_3$, $Y_2O_3$, $La_2O_3$, and mixtures thereof, and
    MO of at least 5 percent, where MO is selected from BaO, BeO, MgO, SrO, CaO, ZnO, PbO and mixtures thereof.

7. The fiber laser of claim 6, wherein the glass includes by weight percentages,
    55 to 65 percent phosphate-oxide $P_2O_5$,
    3 to 5 percent $Al_2O_3$,
    0.75 to 1.5 percent $B_2O_3$,
    24 to 28 percent BaO, and
    0.75 to 1.5 percent ZnO.

8. The fiber laser of claim 1, wherein the gain fiber is less than 3 cm in length.

9. The fiber laser of claim 1, wherein the gain fiber is a polarization maintaining (PM) fiber.

10. The fiber laser of claim 9, wherein the polarization whose stimulated emission cross section of the gain fiber is high is aligned to the orientation of the operating polarization of the narrow-band fiber Bragg grating.

11. The fiber laser of claim 1, wherein the narrowband grating has a linewidth less than 0.07 nm and the broadband grating has a linewidth between 0.07 nm and 0.4 nm.

12. The fiber laser of claim 1, wherein the single-mode signal has greater than 2 mW of output power.

13. The fiber laser of claim 1, wherein the single-mode signal has greater than 20 mW of output power.

14. A fiber laser, comprising:
    A gain fiber less than 5 cm in length including,
        A cladding formed from an oxide-based multi-component glass selected from phosphate, germanate, or tellurite; and
        A single mode core formed from the same glass doped with 0.5–30% ytterbium oxide;
    A passive silica fiber having a narrowband grating formed therein and fused at one end of the gain fiber;
    A passive silica fiber having a broadband grating formed therein and fused at the other end of the gain fiber; and
    A source of pump radiation that illuminates the fiber so that the ytterbium oxide ions lase at a single longitudinal mode and said fiber outputs a single-mode signal having a center wavelength at approximately 1 $\mu$m.

15. The fiber laser of claim 14, wherein the glass is doped with 6–15 wt. % ytterbium oxide.

16. The fiber laser of claim 14, wherein the glass includes by weight percentages,
    55 to 65 percent phosphate-oxide $P_2O_5$,
    3 to 5 percent $Al_2O_3$,
    0.75 to 1.5 percent $B_2O_3$,
    24 to 28 percent BaO, and
    0.75 to 1.5 percent ZnO.

17. The fiber laser of claim 14, wherein the gain fiber is less than 3 cm in length.

18. The fiber laser of claim 14, wherein the single-mode signal has a linewidth of less than 10 kHz.

19. A fiber laser, comprising:
    A gain fiber less than 5 cm in length including,
        A cladding formed from an oxide-based multi-component glass including 55 to 65 weight percent phosphate-oxide $P_2O_5$, 3 to 5 weight percent $Al_2O_3$, 0.75 to 1.5 percent $B_2O_3$, 24 to 28 weight percent BaO, and 0.75 to 1.5 weight percent ZnO; and
        A core formed from the same glass doped with 3–20 weight percent ytterbium oxide;
    A narrowband grating at one end of the fiber;
    A broadband grating at the other end of the fiber; and
    A source of pump radiation that illuminates the fiber so that the ytterbium oxide ions lase at a single longitudinal mode and said fiber outputs a single-mode signal having a center wavelength at approximately 1 $\mu$m.

20. The fiber laser of claim 19, wherein the narrowband and broadband gratings are formed in sections of passive silica fiber that are fusion spliced to the ends of the gain fiber.

21. The fiber laser of claim 19, wherein the single-mode signal has a linewidth of less than 10 kHz.

* * * * *